United States Patent [19]
Hayn et al.

[11] Patent Number: 4,747,461
[45] Date of Patent: May 31, 1988

[54] TRACTION SLIP CONTROL DEVICE

[75] Inventors: Holger V. Hayn, Frankfurt/Main; Joachim Maas, Darmstadt, both of Fed. Rep. of Germany

[73] Assignee: Alfred Teves GmbH, Frankfurt Am Main, Fed. Rep. of Germany

[21] Appl. No.: 54,400

[22] Filed: May 26, 1987

[30] Foreign Application Priority Data

May 26, 1986 [DE] Fed. Rep. of Germany ....... 3617631

[51] Int. Cl.⁴ .......................... B60T 8/16; F02D 7/00
[52] U.S. Cl. .................................. 180/197; 123/396; 123/401; 180/176
[58] Field of Search .............. 180/197, 170, 175, 176; 92/29; 91/41; 123/396, 398, 401

[56] References Cited

U.S. PATENT DOCUMENTS

| | | | |
|---|---|---|---|
| 3,802,528 | 4/1974 | Leiber | 180/197 |
| 3,844,371 | 10/1974 | Garcea | 180/197 |
| 4,077,370 | 3/1978 | Spangenberg | 128/401 |
| 4,458,645 | 7/1984 | Schwartzman | 128/396 |

*Primary Examiner*—John J. Love
*Assistant Examiner*—Donn McGiehan
*Attorney, Agent, or Firm*—James B. Raden; Robert P. Seitter

[57] ABSTRACT

A traction slip control device for motor vehicles is disclosed including a sensor responding to a beginning slip of the driving wheels. The sensor operates via a control circuitry, the accelerator pedal-operated throttle valve at the vehicle engine, in a manner for reduction of the engine's driving power. The accelerator pedal is overriden by means of a hydraulic control element connected in. Parallel to the accelerator pedal is a piston rod arranged in a bore within a stepped piston associated with the hydraulic control element. The piston rod is, via a ball lock, adapted to be axially coupled with the stepped piston such that the piston rod is entrained by the stepped piston and shifts the throttle valve in the direction of closure in opposition to the force acting upon the accelerator pedal.

10 Claims, 1 Drawing Sheet

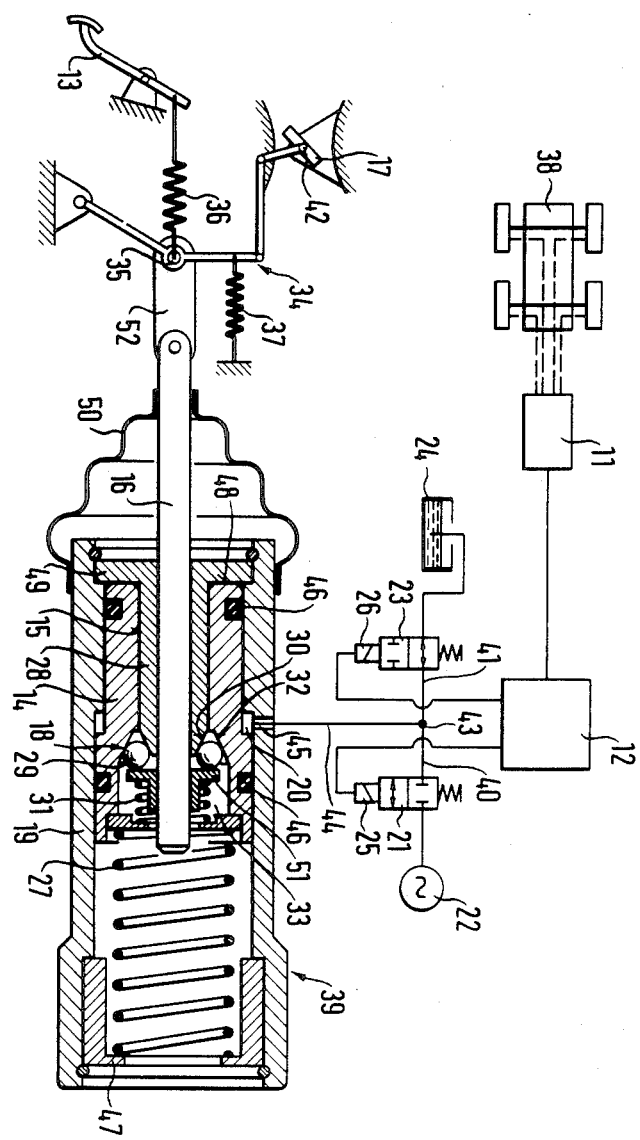

TRACTION SLIP CONTROL DEVICE

BACKGROUND OF THE INVENTION

The present invention relates to a traction slip control device for motor vehicles including a sensor responding to a beginning slip of the driving wheels. The sensor operates by way of a control circuitry the accelerator pedal-operated throttle valve at the vehicle engine so as to override the accelerator pedal and reduce the engine's driving power to reduce wheel slip.

Providing for traction slip control of motor vehicles requires adjustment of the throttle valve which theretofore has typically been accomplished with electric motors.

SUMMARY OF THE INVENTION

It is the object of the present invention to use a hydraulic control element instead of electric motors to adjust the throttle, but which does not require circulation of hydraulic fluid.

To achieve this object, the present invention provides for a piston rod arranged within a stepped piston in an axial through bore connected to the engine throttle valve in parallel to the accelerator pedal. The piston rod is axially coupled by a ball-type axial lock with the stepped piston which is acted upon through the control circuitry such that the piston rod, which is entrained by the stepped piston, shifts the throttle valve in the direction of closure in opposition to the force acting upon the accelerator pedal whenever the sensor detects a beginning of wheel slip.

Due to this design, the throttle valve is actuated in the direction of closure at a beginning slip by the control piston which entrains the piston rod through the ball lock. The shifting force generated by the control piston exceeds the force maximally effective at the accelerator pedal. In order to confine this force, it is provided, according to a particularly favorable embodiment of the present invention, to insert a compensating spring in the actuating linkage provided between the accelerator pedal and the throttle valve, upstream of the articulating point whereat the piston rod is connected to the linkage. The tractive force of the compensating spring is overcome when the accelerator pedal is depressed, by means of the stepped piston which is acted upon hydraulically.

Advantageously, the throttle valve is, however, closed even further when the accelerator pedal is released and returned to its initial position by means of its associated return spring. This return movement is possible because the piston rod which is acted upon by the accelerator linkage during the return movement is, while releasing the ball lock, displaceable relative to the stepped piston in the same direction as the stepped piston is displaced under the effect of the hydraulic pressure.

An advantageous constructional feature provides for the stepped piston to be arranged within a stepped cylinder, and an annular pressure chamber between the stepped piston and the stepped cylinder is connected through an opening valve to a pressure source and through a closing valve to a return reservoir. The opening valve and the closing valve are actuated by electromagnets connected to and controlled by the control circuitry.

The control circuitry thus causes the pressure at the stepped piston to be either increased or decreased, according to the slip occurring, by means of appropriate actuation of both valves.

Preferably, the stepped piston is pre-leaded to its inoperative position, in opposite direction to the hydraulic force, by means of a return spring.

A constructionally compact and, advantageous feature provides for the ball lock to include a sleeve arranged, fast with the cylinder, within the axial bore of the stepped piston and on the position rod. The sleeve is provided with a cone-type taper at its end face which is directed towards the plurality of balls which are arranged around the piston rod. The balls are urged against the taper by means of an auxiliary spring bearing against the stepped piston with the stepped piston in its inoperative position. The balls abut against a cone-type extension at the periphery of a front hollow space provided in the stepped piston when lifted off the piston rod.

BRIEF DESCRIPTION OF THE DRAWING

The present invention will be described with reference to the drawing which is a partial schematic and sectional view of the traction slip control device according to the invention with the hydraulic control element being shown in an axial cross-sectional.

DETAILED DESCRIPTION OF THE PREFERRED EMBODIMENT

According to the drawing, rotating speed signals are transmitted from the four wheels of a motor vehicle 38 to a sensor 11 which generates a signal indicating a beginning slip of the driving wheels and reports the signal to a control circuitry 12. The control circuitry 12 acts upon an opening valve 21 arranged between a pressure source 22 and the inventive hydraulic control element 39 by means of an electromagnet 25, and upon a closing valve 23 also arranged between the hydraulic control element 39 and a return reservoir 24 by means of an electromagnet 26.

The hydraulic conduits 40, 41 leading from the opening valve 21 and the closing valve 23 to the hydraulic control element 39 are connected together at point 43, wherefrom a common hydraulic conduit 44 leads to a circumferential connecting bore 45 of a stepped cylinder 19 which is a component part of the hydraulic control element 39.

Within the hydraulic stepped cylinder 19, a complimentarily dimensioned stepped piston 14 is axially displaceably arranged and sealed relative to the stepped cylinder 19 by means of annular seals 46. In this manner, the hydraulic fluid which enters the annular pressure chamber 20 between the stepped cylinder 19 and the stepped piston 14 via the circumferential bore 45 can not escape between the stepped piston 14 and the stepped cylinder 19.

On the right end face, as shown in the drawing, the stepped cylinder 19 is open. On this side the cylinder can also be closed, for example, in a non-pressure-tightly manner by means of a protecting cover 47. A return spring 27 shaped in the form of a pressure screw spring extends between the stepped piston 14 and the protecting cover 47 and preloads the stepped piston 14 to its left end position, as shown in the drawing, where it abuts with its left end face 48 against an annular disc 49 formed fast with the cylinder. The annular disc seals the stepped cylinder 19 on the left side in a non-pressure-tightly manner.

The stepped piston 14 is provided with a concentric axial bore 15 extending through which is a sleeve 28 having a sliding fit, which sleeve is of integral design with the annular disc 49.

On the side directed away from the end face 48, the stepped piston is provided with a concentric front hollow space 33 converging within the area of the annular pressure chamber 20 into the axial bore 15 forming a cone-type extension 32 which widens in the direction from the end face 48 toward the protecting cover 47.

Extending through the circular cylindrical sleeve 28 and the annular disc 49 is a piston rod 16 having a sliding fit. The piston rod projects over the right end of the stepped piston 14. On the left side, the piston rod 16 extends up to and through an elastic dust boot 50 which is tightly mounted onto the left end of the stepped cylinder 19.

The right end of the sleeve 28 is provided with a cone-type taper 30 at the inner circumference of the stepped piston 14, which taper is radially opposite the extension 32. Within the area of which taper a plurality of small balls 29 is arranged around the piston rod 16. On the side of the balls 29 directed away from the taper 30, a stop ring 51 axially abutting against the balls 29 is provided. The stop ring is urged in the direction of the balls 29 by means of an auxiliary spring 31 which bears against the stepped piston 14. In this manner, a ball lock 18 is formed.

The auxiliary spring 31 urges the balls via the stop ring 51 diagonally outwardly along the taper 30 until it abuts against the internal extension 32 of the stepped piston 14. In this stage, during which the stepped piston 14 assumes its inoperative position, as shown in the drawing, the ball lock 18 is thus open, and the piston rod 16 can move freely in both directions within the sleeve 28.

The end of the piston rod projecting from the annular disc 49 on the left side is connected with the actuating linkage 34 for the throttle valve 17 of the vehicle 38 through an arm 52, which throttle valve is tiltingly mounted to the carburetor by means of a joint 42.

The accelerator pedal 13 is pivotably attached to the vehicle's splash-board. The pedal acts upon the actuating linkage 34 via a compensating spring 36 such that, when depressing the accelerator pedal 13, the throttle valve 17 is swivelled in the direction of opening.

Downstream of the compensating spring 36, the arm 52 which is connected with the piston rod 16 is articulated at the actuating linkage 34 which is pre-loaded to its inoperative position by means of a return spring 37 bearing against the vehicle chassis.

The mode of operation of the traction slip control device described herein is as follows:

When no slip is occurring, the stepped piston 14 assumes the inoperative position, as shown in the drawing. The piston rod 16 can move freely in both directions within the sleeve 28, and the accelerator pedal 13 shifts the throttle valve 17 at the vehicle engine according to its tilting angle.

As soon as the sensor 11 detects a beginning slip of the driving wheels of the motor vehicle 38, the control circuitry 12 initiates an opening of the opening valve 21 and a closure of the closing valve 23 through the intermediary of the electromagnets 25, 26. A hydraulic pressure thereby is built up in the annular pressure chamber 20, which pressure displaces the stepped piston 14 to the right, as shown in the drawing. As a result, the circumferential surface of the extension 32 entrains the balls 29 slightly to the right, and finally urges them radially inwardly against the piston rod 16, with the annular stop 51 slightly compressing the auxiliary elements 31. The ball lock 18 is now blocked due to the inclination of the extension 32, and when the stepped piston 14 further moves to the right, as shown in the drawing, it entrains the piston rod 16 which then actuates the throttle valve 17 in the direction of closure via the arm 52 and the actuating linkage 34, as a result whereof the driving power of the driving wheels is reduced. By this means, the slip which begins to develop is eliminated, and the sensor 11 reports this fact to the control circuitry 12. The control circuitry then closes the opening valve 21 and opens the closing valve 23, whereby the annular pressure chamber 20 is connected with the return reservoir 24 and the return spring 27, while pressing the hydraulic fluid out of the annular pressure chamber 20, returns the stepped piston 14 to the inoperative position, as shown in the drawing, until the end face 48 abuts against the annular disc 49.

Since the circumferential surface of the extension 32 now again moves radially away from the balls 29, the auxiliary spring 31 can, via the stop ring 51, shift the balls 29 again to the position, as shown in the drawing, in which the ball lock 18 is unblocked.

An important fact is that, when the ball lock 18 is blocked, the piston rod 16 can be further moved to the right, as shown in the drawing, under the influence of the return spring 37, since the ball lock 18 acts only in one direction in the manner of a free-wheel.

What is claimed is:

1. A traction slip control device for motor vehicles, comprising a sensor responsive to a beginning slip of a driven wheel, said sensor connected to a control circuit for operating an accelerator pedal-operated throttle valve at the vehicle engine to reduce the engine's driving power, a piston rod arranged within an axial bore in a stepped piston, said piston rod is connected to the throttle valve in parallel to the accelerator pedal, said piston rod being disconnected from said stepped piston in an inoperative position of the stepped piston and axial ball lock adapted to lock said piston rod to said stepped piston upon detection of a beginning slip, said piston rod shifts the throttle valve in a direction of throttle valve closure in opposition to a force acting upon the accelerator pedal.

2. The device according to claim 1, wherein the stepped piston is arranged within a stepped cylinder and an annular pressure chamber is formed between the stepped piston and the stepped cylinder, said pressure chamber is connected through an opening valve to a pressure source and through a closing valve to a return reservoir, the opening valve and the closing valve each being actuated by an electromagnet connected to and controlled by the control circuit.

3. The device according to claim 1, wherein the stepped piston is pre-loaded to the inoperative position by a return spring.

4. The device according to claim 3, wherein the ball lock includes a sleeve on the piston rod and arranged, formed fast with the stepped cylinder, within the axial bore of the stepped piston, said sleeve being provided with a cone-type taper at an end face thereof, a plurality of balls arranged around the piston rod, said balls taper urged against the taper by an auxiliary spring bearing against the stepped piston, with the stepped piston in the inoperative position, said balls abutting against a cone-type extension at the periphery of a front hollow space provided in the stepped piston when said balls are lifted off the piston rod.

5. The device according to claim 4, wherein a compensating spring is provided between said accelerator pedal and a connection point of the piston rod to the actuating linkage, said compensating spring further being between the accelerator pedal and the throttle valve, the tractive force of said compensating spring being overcome when the accelerator pedal is depressed by the stepped piston when hydraulically actuated.

6. The device according to claim 5, wherein the piston rod protrudes through a bore in a closing disc at one end of the device proximate the actuating linkage.

7. The device according to claim 6, wherein the closing disc is integral the sleeve.

8. The device according to claim 7, wherein an end face of the device opposite said one end includes a protecting cover.

9. The device according to claim 8, wherein the return spring is clamped between the stepped piston and the protecting cover.

10. The device according to claim 9, wherein cylinder chambers at opposite faces of the stepped piston are each bled to atmosphere.

* * * * *